(12) United States Patent
Leskes (10) Patent No.: US 10,997,204 B2
(45) Date of Patent: May 4, 2021

(54) CROSS CLUSTER REPLICATION

(71) Applicant: Elasticsearch B.V., Mountain View, CA (US)

(72) Inventor: Boaz Leskes, Amsterdam (NL)

(73) Assignee: Elasticsearch B.V., Amsterdam (NL)

( * ) Notice: Subject to any disclaimer, the term of this patent is extended or adjusted under 35 U.S.C. 154(b) by 257 days.

(21) Appl. No.: 16/229,847

(22) Filed: Dec. 21, 2018

(65) Prior Publication Data

US 2020/0201879 A1 Jun. 25, 2020

(51) Int. Cl.
*G06F 16/27* (2019.01)
*G06F 11/14* (2006.01)
*G06F 11/28* (2006.01)
*H04L 29/06* (2006.01)

(52) U.S. Cl.
CPC .......... *G06F 16/27* (2019.01); *G06F 11/1407* (2013.01); *G06F 11/1464* (2013.01); *G06F 11/28* (2013.01); *H04L 63/0428* (2013.01); *G06F 2201/84* (2013.01)

(58) Field of Classification Search
CPC ....................................................... G06F 16/27
USPC ................................................ 707/610, 737
See application file for complete search history.

(56) References Cited

U.S. PATENT DOCUMENTS

| | | | |
|---|---|---|---|
| 7,565,217 B2* | 7/2009 | Grosman | G06F 16/22 700/100 |
| 8,615,794 B1 | 12/2013 | Tomilson et al. | |
| 8,898,261 B1 | 11/2014 | Patsenker et al. | |
| 9,734,180 B1 | 8/2017 | Graham et al. | |
| 10,541,983 B1 | 1/2020 | Khashei Varnamkhasti et al. | |
| 2005/0004892 A1 | 1/2005 | Brundage et al. | |
| 2005/0114397 A1 | 5/2005 | Doshi et al. | |
| 2006/0269546 A1* | 11/2006 | Srivastava | C07K 14/47 424/143.1 |

(Continued)

FOREIGN PATENT DOCUMENTS

| | | |
|---|---|---|
| CN | 106934062 A | 7/2017 |
| WO | WO2020131330 A1 | 6/2020 |

OTHER PUBLICATIONS

Willnauer, Daniel, "Shard Splitting," U.S. Appl. No. 16/176,956, filed Oct. 31, 2018, Specification, Claims, Abstract, and Drawings, 47 pages.

(Continued)

*Primary Examiner* — Alexandria Y Bromell
(74) *Attorney, Agent, or Firm* — Carr & Ferrell LLP (57) ABSTRACT

Methods and systems for cross cluster replication are provided. Exemplary methods include: periodically requesting by a follower cluster history from a leader cluster, the history including at least one operation and sequence number pair, the operation having changed data in a primary shard of the leader cluster; receiving history and a first global checkpoint from the leader cluster; when a difference between the first global checkpoint and a second global checkpoint exceeds a user-defined value, concurrently making multiple additional requests for history from the leader cluster; and when a difference between the first global checkpoint and the second global checkpoint is less than a user-defined value, executing the at least one operation, the at least one operation changing data in a primary shard of the follower cluster, such that an index of the follower cluster replicates an index of the leader cluster.

20 Claims, 8 Drawing Sheets

(56) References Cited

U.S. PATENT DOCUMENTS

| | | | | |
|---|---|---|---|---|
| 2010/0161609 | A1* | 6/2010 | Fogel | G06K 9/6284 |
| | | | | 707/737 |
| 2012/0017037 | A1* | 1/2012 | Riddle | G06F 16/25 |
| | | | | 711/103 |
| 2012/0233118 | A1* | 9/2012 | Holt | G06F 16/2219 |
| | | | | 707/620 |
| 2012/0233299 | A1 | 9/2012 | Attanasio et al. | |
| 2013/0086039 | A1* | 4/2013 | Salch | G06F 16/183 |
| | | | | 707/717 |
| 2013/0204872 | A1* | 8/2013 | Runchey | G06F 16/27 |
| | | | | 707/736 |
| 2013/0297469 | A1* | 11/2013 | Spittle | G06Q 10/10 |
| | | | | 705/35 |
| 2014/0157224 | A1* | 6/2014 | Capuozzo | G06F 8/00 |
| | | | | 717/100 |
| 2014/0279871 | A1* | 9/2014 | Ochoa | G06F 16/273 |
| | | | | 707/610 |
| 2016/0140003 | A1* | 5/2016 | Panara | G06F 11/2092 |
| | | | | 714/6.21 |
| 2016/0224600 | A1* | 8/2016 | Munk | G06Q 20/102 |
| | | | | 707/707 |
| 2016/0366220 | A1* | 12/2016 | Gottlieb | H04L 69/08 |
| | | | | 707/707 |
| 2017/0024453 | A1* | 1/2017 | Raja | H04L 47/125 |
| | | | | 707/707 |
| 2017/0124151 | A1* | 5/2017 | Ji | G06F 16/24542 |
| | | | | 707/707 |
| 2017/0371926 | A1* | 12/2017 | Shiran | G06F 16/24542 |
| | | | | 707/707 |
| 2018/0150488 | A1* | 5/2018 | Runchey | H04L 67/42 |
| | | | | 707/707 |
| 2018/0225356 | A1* | 8/2018 | Yue | G06F 16/27 |
| 2018/0268000 | A1* | 9/2018 | McManus | G06F 16/256 |
| | | | | 707/707 |
| 2018/0276090 | A1* | 9/2018 | Pandit | H04L 67/1097 |
| | | | | 707/707 |
| 2019/0026336 | A1* | 1/2019 | Tian | G06F 16/2433 |
| | | | | 707/707 |
| 2019/0266271 | A1* | 8/2019 | Leau | G06F 16/2433 |
| | | | | 707/707 |
| 2019/0392072 | A1* | 12/2019 | Ben-Romdhane | G06F 16/27 |
| | | | | 707/707 |
| 2020/0050612 | A1 | 2/2020 | Bhattacharjee et al. | |
| 2020/0084213 | A1* | 3/2020 | Taropa | G06F 16/3322 |
| | | | | 707/707 |
| 2020/0133550 | A1* | 4/2020 | Willnauer | G06F 3/065 |
| | | | | 707/707 |
| 2020/0176098 | A1 | 6/2020 | Lucas et al. | |
| 2020/0328936 | A1 | 10/2020 | Pérez-Aradros et al. | |
| 2020/0348878 | A1 | 11/2020 | Leskes | |

OTHER PUBLICATIONS

Willnauer, Simon Daniel, "Frozen Indices," U.S. Appl. No. 16/383,562, filed Apr. 12, 2019, Specification, Claims, Abstract, and Drawings, 50 pages.

Leskes, Boaz, "Cross Cluster Replication," U.S. Appl. No. 16/229,847, filed Dec. 21, 2018, Specification, Claims, Abstract, and Drawings, 53 pages.

Makwarth et al., "Distributed Tracing for Application Performance Monitoring, " U.S. Appl. No. 16/381,997, filed Apr. 11, 2019, Specification, Claims, Abstract, and Drawings, 43 pages.

"International Search Report" and "Written Opinion of the International Searching Authority," Patent Cooperation Treaty Application No. PCT/US2019/063437, dated Feb. 7, 2020, 8 pages.

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Willnauer, Simon Daniel, "Shard Splitting," U.S. Appl. No. 16/176,956, filed Oct. 31, 2018, Specification, Claims, Abstract, and Drawings, 47 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

* cited by examiner

CROSS CLUSTER REPLICATION

FIELD OF THE INVENTION

The present technology pertains to organized collections of information and more specifically to granular replication of organized collections of information.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data communications networks can be used for a distributed application structure that divides tasks between the providers of a resource or service, called servers, and service requesters, called clients. A server host runs one or more server programs, which share their resources with clients. A client does not necessarily share any of its resources, but requests a server's content or service function. Clients initiate communication sessions with servers which await incoming requests.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for cross cluster replication. Specifically, a method for cross cluster replication may comprise: periodically requesting by a follower cluster history from a leader cluster, the history including at least one operation and sequence number pair, the operation having changed data in a primary shard of the leader cluster; receiving history and a first global checkpoint from the leader cluster; when a difference between the first global checkpoint and a second global checkpoint exceeds a user-defined value, concurrently making multiple additional requests for history from the leader cluster; and when a difference between the first global checkpoint and the second global checkpoint is less than a user-defined value, executing the at least one operation, the at least one operation changing data in a primary shard of the follower cluster, such that an index of the follower cluster replicates an index of the leader cluster.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Figure 1:
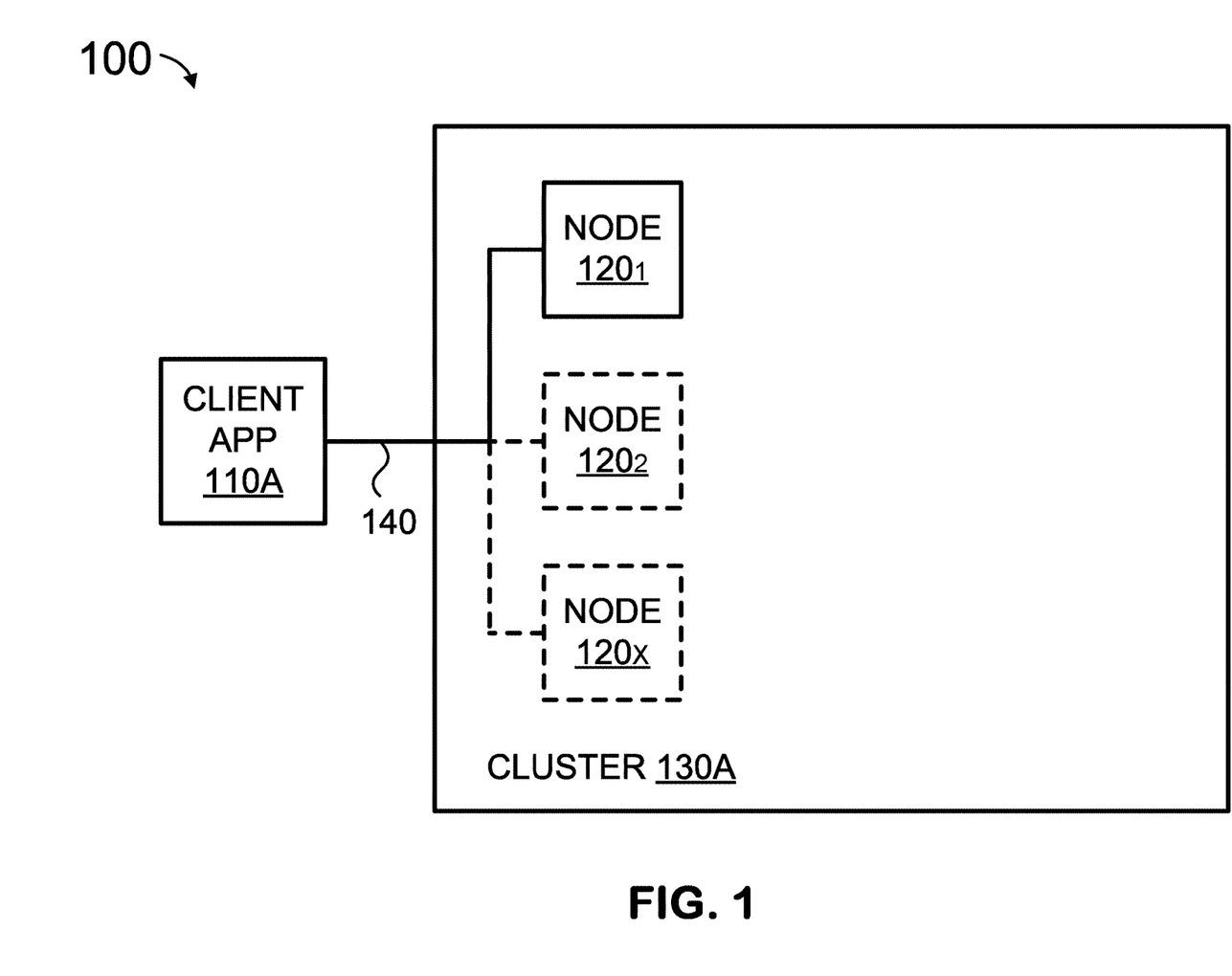
FIG. 1 is a simplified block diagram of a system having a distributed application structure, according to some embodiments.

FIG. 1 shows system 100 having a distributed application structure, according to some embodiments. System 100 includes client application 110A, one or more nodes $120_1$-$120_x$, and connections 140. Collectively, one or more nodes $120_1$-$120_x$ form cluster 130A. When only one node (e.g., node $120_1$) is running, then cluster 130A is just one node.

In various embodiments, a cluster (e.g., cluster 130A) is a collection of one or more nodes (servers) (e.g., one or more nodes $120_1$-$120_x$) that together store data and provides federated indexing and search capabilities across all nodes. A cluster can be identified by a unique name, such that a node can be part of a cluster when the node is set up to join the cluster by its name. A cluster may have only one node in it.

In some embodiments, a node (e.g., one or more nodes $120_1$-$120_x$) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster.

An index (not depicted in FIG. 1) is a collection of documents that have somewhat similar characteristics, according to various embodiments. For example, you can have an index for customer data, another index for a product catalog, and yet another index for order data. An index is identified by a name and this name is used to refer to the index when performing indexing, search, update, and delete operations against the documents in it. A document (not depicted in FIG. 1) is a basic unit of information that can be indexed, according to some embodiments. For example, you can have a document for a single customer, another document for a single product, and yet another for a single order. An index can potentially store a large amount of data that can exceed the hardware limits of a single node. For example, a single index of a billion documents taking up 1 TB of disk space may not fit on the disk of a single node or may be too slow to serve search requests from a single node alone. An index can be subdivided into multiple pieces called shards. Subdividing an index into shards can be referred to as "sharding." Each shard can be a fully-functional and independent "index" that can be hosted on any node (e.g., one or more nodes $120_1$-$120_x$) in the cluster. For example, sharding can offer the benefits of horizontally splitting/scaling content, and distributing and parallelizing operations across shards (and potentially multiple nodes) to increase performance/throughput.

In some embodiments, at least one application programming interface (API) can be used to communicate with a cluster (e.g., cluster 130A). An API can include a set of subroutine definitions and protocols. For example, a node client and/or a transport client can be used be used to communicate with nodes (e.g., one or more nodes $120_1$-$120_x$) in a cluster. A node client joins a local cluster as a non-data node, which doesn't hold any data itself, but knows what data lives on which node in the cluster, and can forward requests directly to the correct node. The transport client can be used to send requests to a remote cluster. It doesn't join the cluster itself, but simply forwards requests to a node in the cluster. Other APIs, such as the RESTful API, can be used. Various languages (e.g., Groovy, JavaScript, .NET, PHP, Perl, Python, Ruby, and the like) can be used to communicate with a cluster using the RESTful API In some embodiments, nodes (e.g., one or more nodes $120_1$-$120_x$) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client application 110A) requests to the appropriate node. Each node can serve one or more purposes, master node and data node.

A master node can perform such cluster-wide actions as creating and/or deleting an index, tracking which nodes (e.g., one or more nodes $120_1$-$120_x$) are part of the cluster (e.g., cluster 130A), and deciding which shards to allocate to which nodes. Data nodes can hold shards that contain documents that have been indexed. Data nodes can handle data related operations such as create, read, update, and delete (operations that are used to administer persistent data storage; also referred to as CRUD), search, and aggregations. Ingest nodes can apply an ingest pipeline (e.g., a definition of a series of processors) to a document in order to transform and enrich the document before indexing. A tribe node can connect to multiple clusters and perform search and other operations across all connected clusters.

Each of client application 110A and one or more nodes $120_1$-$120_x$ can be a physical computing system, virtual machine, container, and the like. Generally, client application 110A can run on the same or different physical computing system, virtual machine, container, and the like as each of one or more nodes $120_1$-$120_x$. Each of one or more nodes $120_1$-$120_x$ can run on the same or different physical computing system, virtual machine, container, and the like as the others of one or more nodes $120_1$-$120_x$. A physical computing system is described further in relation to the exemplary computer system 700 of FIG. 7.

In some embodiments, virtual machines provide a substitute for a physical computing system and the functionality needed to execute entire operating systems. Virtual machines are created and run by a hypervisor which uses native execution to share and manage hardware, allowing for multiple environments which are isolated from one another, yet can exist on the same physical computing system.

In various embodiments, containers are an operating system-level virtualization method for deploying and running distributed applications without launching an entire virtual machine for each application. Containers can look like real computers from the point of view of programs running in them. Generally, a computer program running on an operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

When client application 110A runs on a different physical server from a node (e.g., of one or more nodes $120_1$-$120_x$), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes $120_1$-$120_x$) runs on a different physical computing system from another node (of one or more nodes $120_1$-$120_x$), connections 140 can be a data communications network.

Figure 2:
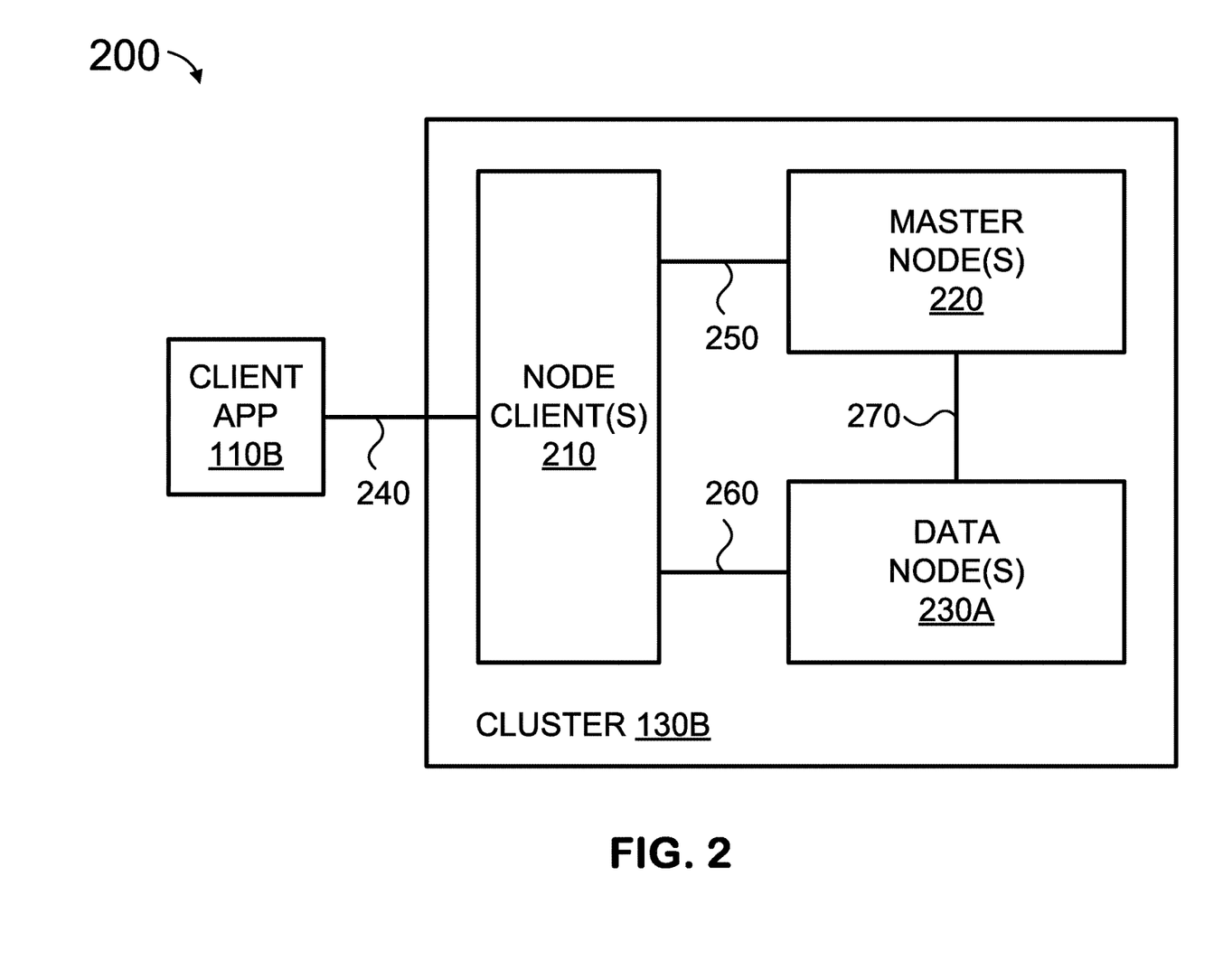
FIG. 2 is a simplified block diagram with a detailed view of a cluster, according to various embodiments.

FIG. 2 shows system 200 having a distributed application structure, according to some embodiments. System 200 can include client application 110B and cluster 130B. Client application 110E and cluster 130B can communicate with each other using communications network 240. Communications network 240 can include various combinations and permutations of wired and wireless networks such as the Internet, local area networks (LAN), metropolitan area networks (MAN), wide area networks (WAN), and the like using Ethernet, Wi-Fi, cellular networks, and the like. Client application 110B and cluster 130B can each have at least some of the characteristics described above in relation to client application 110A and cluster 130A (including one or more nodes $120_1$-$120_x$) in FIG. 1, respectively. Cluster 130B can include node client(s) 210, master node(s) 220, and data node(s) 230A. Node clients, master nodes, and data nodes were described above in relation to FIG. 1.

According to various embodiments, connections 240-270 can each include the same or different data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). For example, client application 110E can send an indexing and/or search request to node client(s) 210, and receive an indexing and/or search response from node client(s) 210 via connections 240. By way of further non-limiting example, node client(s) 210 can coordinate cluster state and metadata with master node(s) 220 via connections 250. By way of additional non-limiting example, node client(s) 210 can forward indexing and/or search requests to data node(s) 230A, and receive an indexing and/or search response from data node(s) 230A via connections 260. By way of further non-limiting example, master node(s) 220 can coordinate cluster state and metadata with data node(s) 230A via connections 270.

Figure 3:
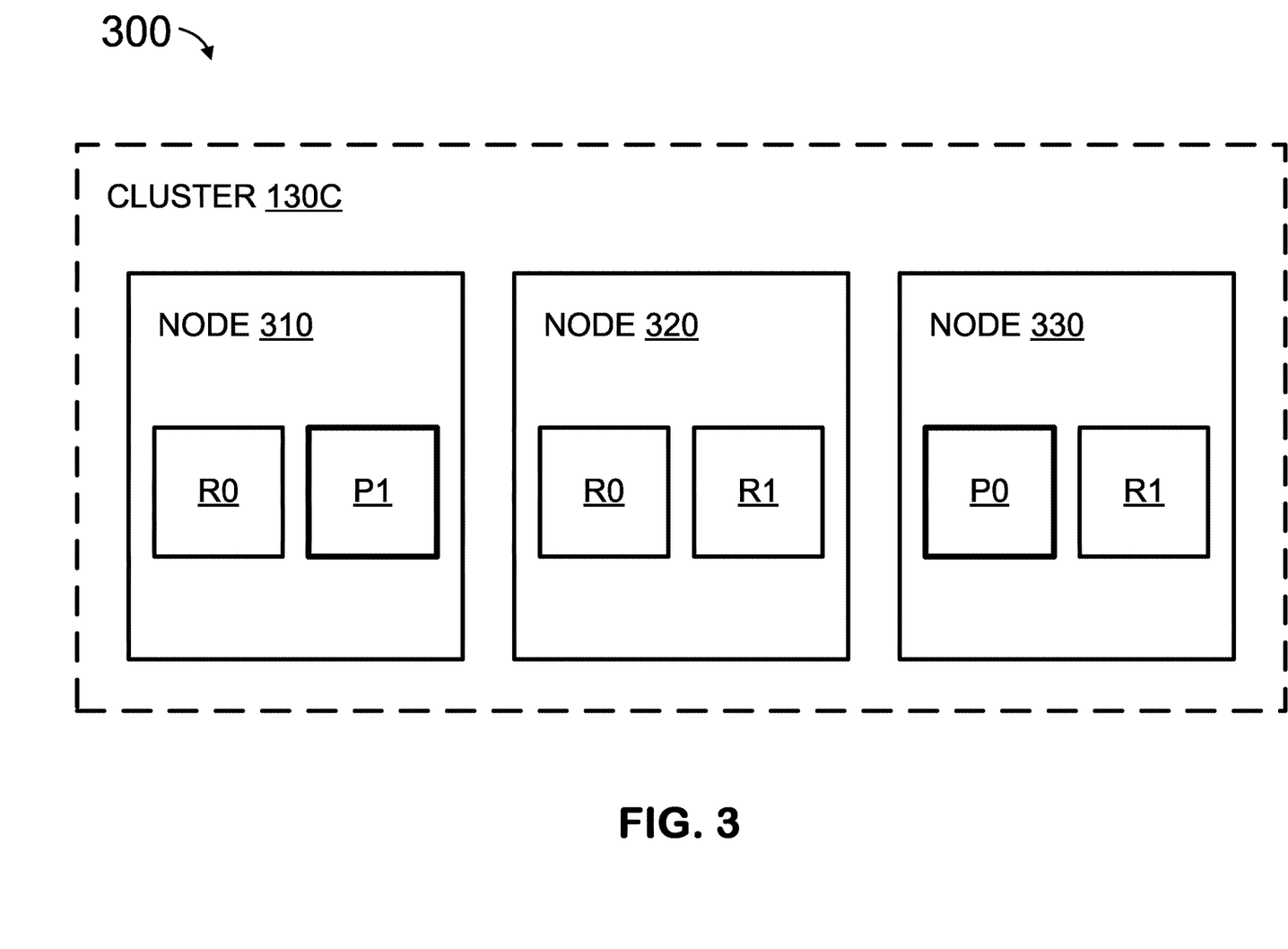
FIG. 3 is a simplified block diagram with a detailed view of nodes, in accordance with some embodiments.

FIG. 3 illustrates topology 300 of cluster 130C, according to some embodiments. Cluster 130C and its constituents can have at least some of the characteristics of cluster 130A (FIG. 1), cluster 130B (FIG. 2), and their constituents. By way of non-limiting example, cluster 130C can include nodes 310-330.

According to some embodiments, the distributed application is a distributed, multitenant-capable full-text search engine, such as Elasticsearch. Elasticsearch is a document-oriented database designed to store, retrieve, and manage document-oriented or semi-structured data. As described above, an index is a collection of documents that can have somewhat similar characteristics and a document is a basic unit of information that can be indexed. An index can potentially store a large amount of data that can exceed the hardware limits of a single node (e.g., data nodes 230A (FIG. 2), and one or more nodes $120_1$-$120_x$ (FIG. 1)).

An index can be subdivided into multiple pieces called shards. When an index is created, the number of shards can be specified. Each shard can in itself be a fully-functional and independent "index" that can be hosted on any node (e.g., data nodes 230A (FIG. 2), and one or more nodes $120_1$-$120_x$ (FIG. 1)) in the cluster (e.g., cluster 130A (FIG. 1) and cluster 130B).

For the purpose of illustration, cluster 130C has one index and the one index has two primary shards P0 (in node 330) and P1 (in node 310). A copy of an index's shard is called a replica shard (or replica for short). Primary shards P0 and P1 can each have two replicas each, R0 (in nodes 310 and 320) and R1 (in nodes 320 and 330), respectively. In general, a replica (e.g., R0 and R1) is not allocated on the same node as its primary shard (e.g., P0 and P1, respectively). Replicas can offer the benefits of high availability in case a shard/node fails (hence the importance of not allocating a replica on the same node as the primary (original) shard that it was copied from), and scaling throughput since operations can be executed on all replicas in parallel.

By way of non-limiting example, a client application (e.g., client application 110A in FIG. 1 and client application 110E in FIG. 2) sends a request to create, index, update, or delete a document. The request can be executed on a primary shard (e.g., P0 and P1). If the request is successfully completed on the primary shard, the request can be forwarded in parallel to replica shards (e.g., R0 and R1). Once the replica shards report that the request was successfully completed, the client application can be notified that the request was successfully completed.

Figure 4A:
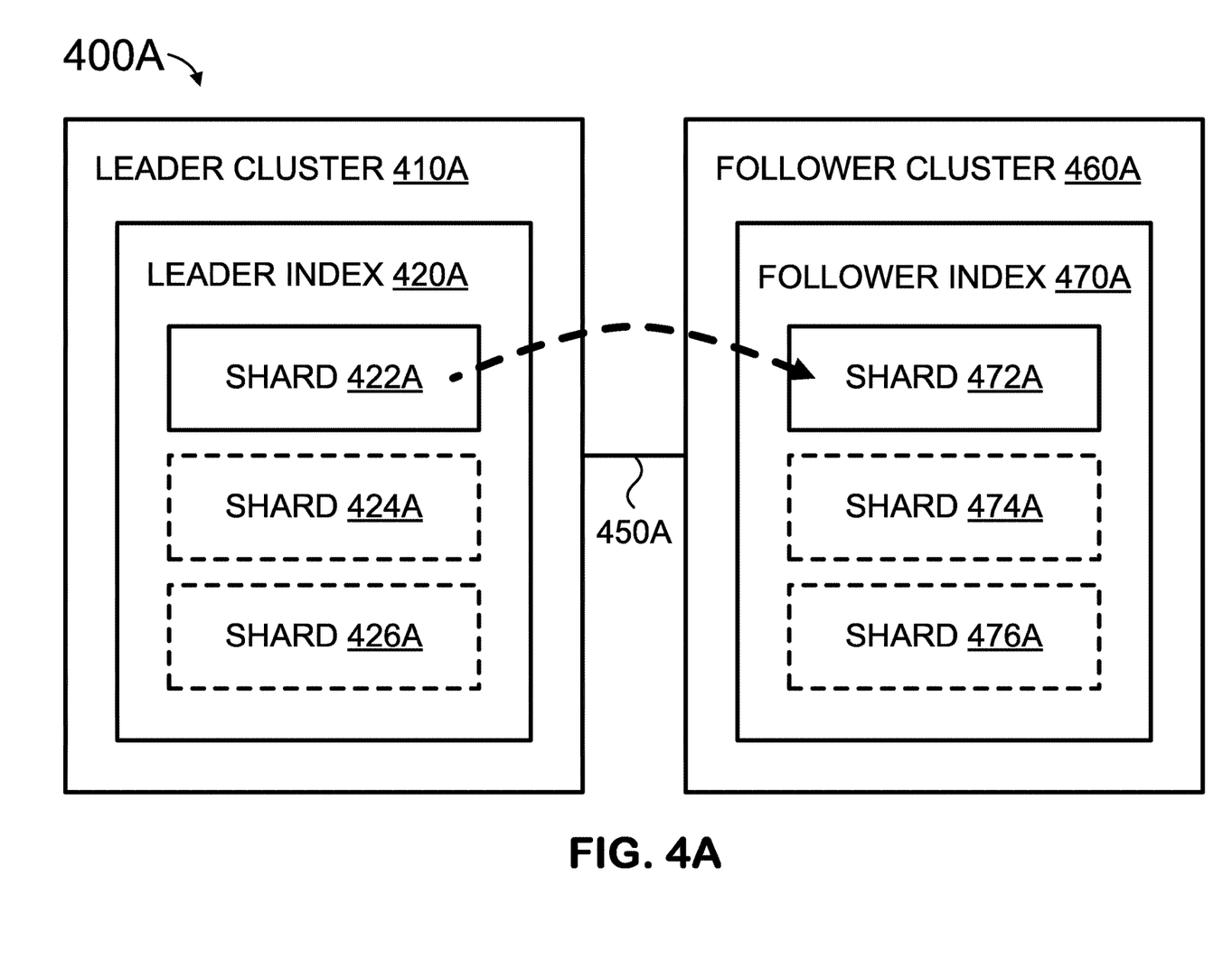
FIGS. 4A and 4B depict systems for cross cluster replication, in accordance with various embodiments.

FIG. 4A is a simplified block diagram of system 400A for cross cluster replication, according to various embodiments. System 400A can include leader cluster 410A and follower cluster 460A. Leader cluster 410A, follower cluster 460A, and their constituents can have at least some of the characteristics of cluster 130A (FIG. 1), cluster 130B (FIG. 2), cluster 130C (FIG. 3), and their constituents. In some embodiments, leader cluster 410A and follower cluster 460A are the same cluster.

Alternatively, leader cluster 410A and follower cluster 460A are different clusters and can be located in different locations, such as datacenters. For example, leader cluster 410A and follower cluster 460A are in different cities, counties, states/provinces/prefectures, countries, and/or continents. For example, follower cluster 460A is a "local" copy in San Jose, Calif. of leader cluster 410A in Tokyo, Japan. In this way, a request from a client application (e.g., in Cupertino, Calif.) can be fulfilled in a low latency fashion by a "local" server (e.g., follower cluster 460A) that is geographically closer to the client application than a primary server (e.g., leader cluster 410A). By way of additional example, follower cluster 460A is a "local" copy in a main office (headquarters) of information from leader cluster 410A in a satellite office, which can be scaled to multiple satellite offices. To have a current view of global operations, managers at headquarters can quickly access data from all over the world, without having to reach out individually to all of the satellite offices and wait for a response from each. By way of further example, follower cluster 460A is a remote backup of leader cluster 410A for disaster recovery purposes. In the event of a natural and/or man-made disaster (e.g., earthquake, flood, storm, fire, terrorist/hacker attack, and the like), follower cluster 460A can serve as a backup of leader cluster 410A.

Leader cluster 410A can include leader index 420A and leader index 420A can include (primary) shards 422A-426A. Follower cluster 460A can include follower index 470A and follower index 470A can include follower (primary) shards 472A-476A. For the purpose of illustration, follower shard 472A is a copy of shard 422A. Although leader cluster 410A and follower cluster 460A are shown as including one index for the purposes of illustration, leader cluster 410A and follower cluster 460A can comprise more than one index. While leader index 420A and follower index 470A are depicted as including three (primary) shards, leader index 420A and follower index 470A can comprise any number of (primary) shards.

To replicate a portion (or all) of leader cluster 410A, an index (or all indexes) of leader cluster 410A to be replicated, such as leader index 420A, is replicated. To replicate a leader index (e.g., leader index 420A), all (primary and replica) shards of the leader index (e.g., shards 422A-426A) can be replicated. Replication of leader shard 422A to follower shard 472A, for example, can apply to replication of leader shards 424A and 426A to follower shards 474A and 476A.

In various embodiments, during the course of operation leader cluster 410A will perform operations (e.g., create, index, update, and delete a document) on (primary) on shard 422A (e.g., responsive to requests, such as from client application 110A, client application 110B, etc.). Each operation is assigned a sequence number. Operations change data, so the every change to data can be thought of as being represented by a sequence number. For example, each operation performed on an index is assigned a sequence number and the sequence number is incremented. Sequence numbers can be numbers represented in various formats (e.g., decimal number). Leader cluster 410A can maintain a history of operations, including operations and their respective sequence numbers.

In addition, leader cluster 410A can keep track of the most recent (e.g., highest) sequence number that it successfully completed, referred to as a global checkpoint. In various embodiments, the global checkpoint is a property of a particular shard being followed, and indexes (and thus clusters) can have more than one. For example, a global checkpoint is the highest sequence number for which leader cluster 410A (or follower cluster 460A) can guarantee that all previous sequence numbers (included in the history) have been processed (e.g., on all active shard copies, both primary and replica shards). Leader cluster 410A follows a horizon of in-progress operations and updates the global checkpoint to the next sequence number after the operation associated with the next sequence number is successfully completed. Leader cluster 410A's (and hence leader index 420A's and leader shard 422A's) global checkpoint can be provided by leader cluster 410A to follower cluster 460A (and hence follower index 470A and follower shard 472A), and follower cluster 460A can request history that follower cluster 460A does not have and is below the global checkpoint of the leader cluster 410A.

While an operation can be assigned a sequence number at leader cluster 410A, the primary may fail before successfully replicating it to all shard copies (replicas). Such operations were applied only to a part of the shard copies and may be rolled back (e.g., undo the operation such that its effect is reversed) at leader cluster 410A to achieve consistency between the shard copies. These operations are not replicated via cross cluster replication and thus do not need to be rolled back on follower cluster 460A (e.g., follower index 470A).

Since a shard (e.g., shard 422A) can be on the order of 50 GB to 200 GB in size, it is impractical to regularly copy all of the data from shard 422A in leader cluster 410A to follower shard 472A in follower cluster 460A. Moreover, a copy would only be a snapshot of continuously changing information. To maintain a current copy of shard 422A, follower cluster 460A can perform the same operations (in the same order or out of order) on follower shard 472A as leader cluster 410A did on shard 422A. Out of order execution offers the benefits of better scalability and concurrency. Follower cluster 460A can (periodically) request the operations and associated sequence numbers (history) that it has not performed from leader cluster 410A, such by using a polling mechanism. The operations can be performed by follower cluster 460A on follower shard 472A (in sequence number order or out of sequence number order). Generally, follower index 470A can be used (e.g., searched) when updated using history and does not need to be taken out of use (e.g., offline).

Follower cluster 460A can have a different application model than leader cluster 410A. As described above, leader cluster 410A process data in response to client requests, assigns sequence numbers to operations (changes to data), and dictates history. In contrast, follower cluster 460A receives the history and applies it.

Leader cluster 410A providing history (e.g., operations and associated sequence numbers) and follower cluster 460A executing the history can be referred to as an active-passive relationship between indexes. Here, leader index 420A is actively changed by client requests and follower index 470A passively follows changes made to index 420A. The active-passive model avoids the complicated coordination required by an active-active replication model, where conflict from changes happening in both indexes at (effectively) the same time can occur.

In various embodiments, follower index 470A can request history based on its own global checkpoint. When follower cluster 460A requests history from leader cluster 410A, leader cluster 410A can respond with an amount (increment) of history (e.g., a certain number of sequence numbers and associated operations, such as on the order of the next 10 to 10,000 sequence numbers and associated operations) immediately following a starting point specified by follower cluster 460A (in the history request). The amount (increment) of history provided in response to each request can be variable (e.g., in a range from 10 to 10,000 sequence numbers and associated operations, depending on the nature of the operations being shipped).

Various information can be exchanged between leader cluster 410A and follower cluster 460A to facilitate communication of history from leader cluster 410A to follower cluster 460A. In some embodiments, follower cluster 460A asks leader cluster for operations if leader cluster has them (e.g., there is history after follower cluster 460A's global checkpoint) and indicate that follower cluster 460A will wait a certain amount of time (e.g., in a range between 30 seconds-300 seconds) for a response. Leader cluster 410A can respond with history (e.g., operations and associated sequence numbers) and current global checkpoint (which is an upper limit on available history and on what follower cluster 460A can request), or an indication that history (after follower cluster 460A's global checkpoint) is not available.

Optionally, leader cluster 410A can compare a requested starting point to a global checkpoint of the particular shard being followed. Follower cluster 460A can fall behind (e.g., a request for history has not been made for hours), such as due to network outages, follower cluster 460A being taken down for maintenance, and the like. Leader index 420A can retain a limited amount of history. When the history requested by follower index 470A is not available, follower index 470A can be notified by leader index 420A and follower index 470A can then fall back to perform a full file copy of leader index 420A. When the history requested by follower index 470A is available, follower index 470A can send multiple concurrent requests, each requesting a different section of the history needed to catch up quicker. Each request can specify a different starting point for history, so that contiguous increments of history are provided in response.

For example, follower shard 472A has a global checkpoint of sequence number 99 and requests history starting at sequence number 100. Leader shard 422A can send operations having sequence numbers 100-199 (e.g., the increment of history is 100 operations). Leader shard 422A can also indicate to follower shard 472A that leader shard 422A's global check point is 1,000. To catch up, follower shard 472A can send multiple concurrent requests for operations having sequence numbers 200-299, 300-399, 400-499, 500-599, 600-699, 700-799, 800-999, and 900-999 (and 1,000). In this way, follower shard 472A can dynamically adjust how often history is requested, such as file multiple concurrent requests to catch up and periodically poll for history once follower shard 472A is caught up (e.g., follower shard 472A's global checkpoint is within a range of 1-100 sequence numbers of leader shard 422A's global checkpoint).

Indexes can have a time-based component. For example, a new version of a leader index is automatically created by leader cluster 410A every hour, day, month, quarter, (calendar or fiscal) year, and the like. Generally, the leader index name will have a component indicating what it is (e.g., sales data) and another component indicating a particular time period (e.g., date stamp, Q4CY2018, CY2018, etc.). Since new leader indexes are regularly created and the leader index names have a predictable name, follower cluster 460A can be setup to automatically create a new follower index to replicate the new leader index in leader cluster 410A. For example, follower cluster 460A can check with leader cluster 410A to see if a new leader index was created and whether the leader index had a name following a particular pattern (which can include wildcards), and if so create a new follower index with the same name to replicate the new leader index.

Creating a new follower index 470A can vary. For example, when leader index 420A is also new, follower index 470A can replicate leader index 420A by executing the history from leader cluster 410A. When leader index 420A already exists, it may be impractical to replicate using only history, because the history (from the very beginning of leader index 420A, such as over a whole year) could be so large it would be too expensive to store. By way of further example, replicating an existing leader index 420A can start by copying all the files of existing leader index 420A at a particular point in time (e.g., noting the global check point at that time) and applying the history immediately following the global checkpoint of the copied files. The files of existing leader index 420A at a particular point in time can be referred to as a snapshot. Here, leader cluster 410A stores at least the history that occurs after the snapshot was created. Until follower index 470A is brought up to date with the history, it should not be used (e.g., taken offline). This process of creating a new follower index 470A can be referred to as the bootstrap process.

When follower shard 472A needs operations that are no longer stored on leader shard 422A, then the above bootstrap process can be used to bring follower shard 472A up to date. Alternatively, leader shard 422A can actively track the position of follower shard 472A and thus make sure to maintain enough history for follower shard 472A to be able to catch up. In this way, there will be enough history to bring follower shard 472A up to date after a long (e.g., on the order of hours) downtime. This technique can be applied when there is more than one follower shard (and hence cluster and index). Leader shard 422A can store enough history for the follower shards to catch up. Advantageously, bringing follower shard 472A (and hence follower index 470A) up to date using history can take substantially less time than the bootstrap process. Should leader shard 422A determine that the size of the history going back to follower shard 472A's global checkpoint is too large (e.g., exceeds a predetermined/user-defined limit), such as when follower cluster 460A has been down for a day or more, then the old history may no longer be stored and follower shard 472A (and hence follower index 470A) can be restored using the bootstrap process described above.

Processes for cross cluster replication can be bifurcated into a high throughput system and a low throughput system. The high throughput system can include data handling by leader cluster 410A. For example, as data is indexed, a large amount of data (e.g., new documents and/or a new version of an existing document) is sent from leader cluster 410A to follower cluster 460A, potentially concurrently, and the global checkpoint is updated to stay current. The low-throughput system can handle metadata changes (e.g., addition of a field) which generally happens infrequently. In some embodiments, the low throughput system piggybacks on the high throughput system (e.g., the high throughput system can include signals that indicate the low throughput system should wake up).

Clusters 410A and 460A can communicate with each other using communications network 450A. Communications network 450A can include various combinations and permutations of wired and wireless networks such as the Internet, local area networks (LAN), metropolitan area networks (MAN), wide area networks (WAN), and the like using Ethernet, Wi-Fi, cellular networks, and the like. Connections over communications network 450A can be secured (e.g., using a cryptographic protocol, such as Secure Sockets Layer (SSL), Transport Layer Security (TLS), and the like).

According to various embodiments, clusters 410A and 460A can have a common security model including user permissions (e.g., who is allowed to read which data, not only from within leader cluster 410A, but remote clusters such a follower cluster 460A). For example, when follower index 470A (and follower shards 472A-476A) is created, leader index 420A is identified as a leader index 420A to replicate, credentials of a user who created follower index 470A are captured, and the credentials are included with requests for history send to leader cluster 410A. Leader cluster 410A can authenticate the credentials and understand the role (e.g., system administrator, salesperson, etc.) of the user when granting permissions. Leader cluster 410A determines how to interpret the role of the user (e.g., decide who get access to what), whereas follower cluster determines the user and the user's role. In addition, there can also be a security model for a background process in follower cluster 460A which periodically polls leader cluster 410A for history.

According to various embodiments, follower index 470A should have the same (number of) primary shards as leader index 420A. By way of non-limiting example, if leader index 420A has five primary shards, then follower index 470A has five primary shards. However, follower (primary) shards 472A-476A do not necessarily need the same number of replicas (or replicas at all) as leader (primary) shards 422A-426A, where the reduced number of computing resources can lower the cost follower cluster 460A.

Similarly, the computer hardware and architecture underlying leader cluster 410A and follower cluster 460A can be the same or different. For example, when follower cluster 460A operates (e.g., fulfill requests) at a level similar to leader cluster 410A, the underlying computer hardware and architecture can be similar to handle the load. By way of further non-limiting example, when follower cluster 460A operates at a lower level than leader cluster 410A (e.g., follower cluster 460A is an off-site backup of leader cluster 410A (and does not fulfill requests)), the underlying computer hardware and architecture can be lower performance and lower cost.

Although FIG. 4A depicts information in system 400 flowing from leader shard 422A (and hence leader index 420A and leader cluster 410A) to follower shard 472A (and hence follower index 470A and follower cluster 460A), in various embodiments follower cluster 460A can act as a leader (e.g., information flows from follower cluster 460A) and leader cluster 410A can act as a follower (e.g., information flows to leader cluster 410A).

Figure 4B:
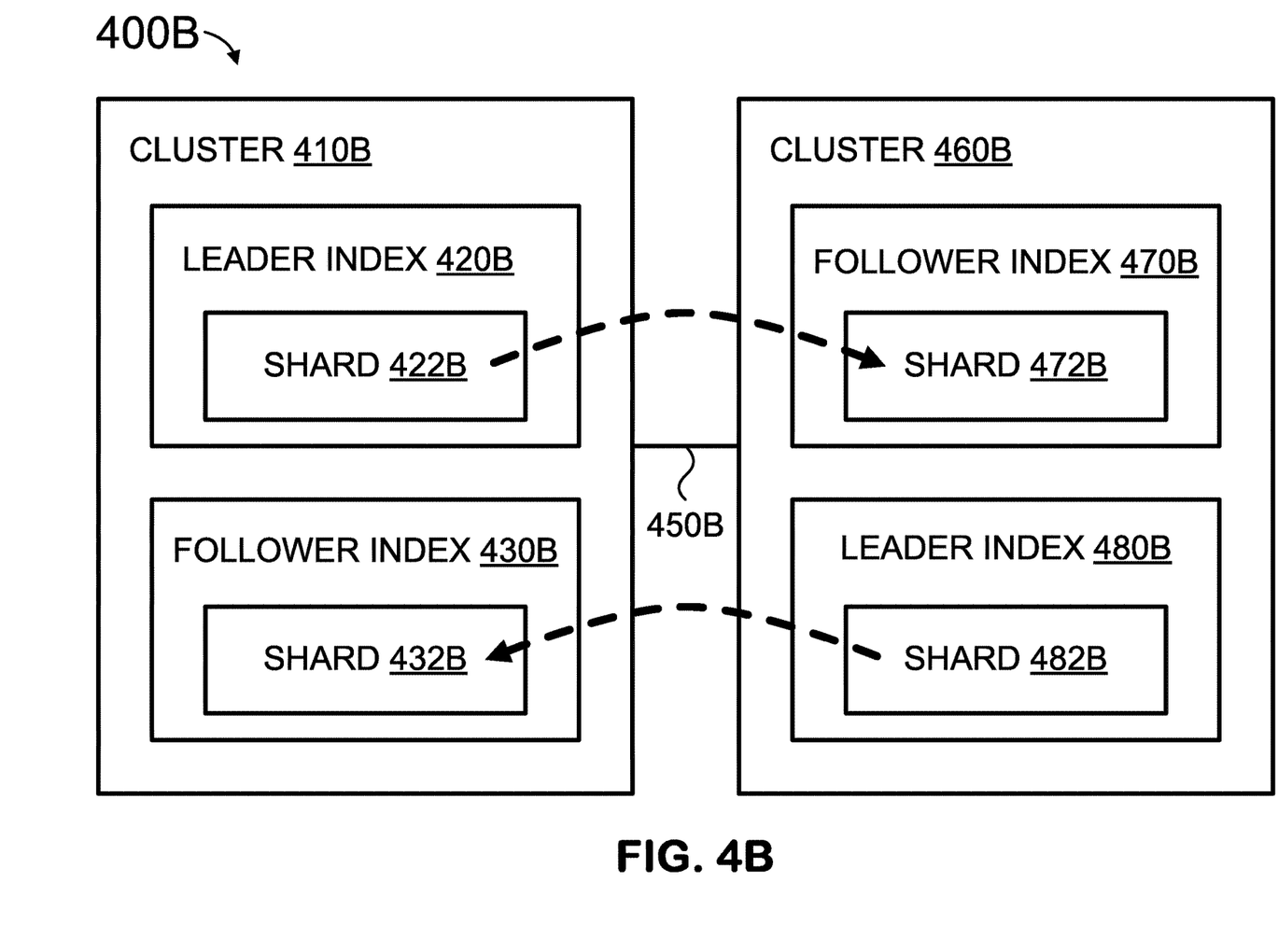

FIG. 4B is a simplified block diagram of system 400B for cross cluster replication, in accordance with various embodiments. System 400B can include clusters 410B and 460B. Clusters 410B and 460B (and their respective constituents) can have at least some of the characteristics of cluster 130A (FIG. 1), cluster 130B (FIG. 2), cluster 130C (FIG. 3), leader cluster 410A and follower cluster 460A (FIG. 4A), and their constituents. Cluster 410B and 460B can communicate with each other using communications network 450B. Communications network 450B can include various combinations and permutations of wired and wireless networks such as the Internet, local area networks (LAN), metropolitan area networks (MAN), wide area networks (WAN), and the like using Ethernet, Wi-Fi, cellular networks, and the like.

Cluster 410B can include indexes 420B and 430B. Index 420B can include (primary) shard 422B and index 430B can include shard 432B. Cluster 460B can include indexes 470B and 480B. Index 470B can include shard 472B and index 480B can include (primary) shard 482B.

In some embodiments, index 420B is a leader index and index 470B is a follower index, such that shard 472B is a copy of shard 422B. In various embodiments, index 480B is a leader index and index 430B is a follower index, such that shard 432B is a copy of shard 482B. System 400B can be advantageous, such as when leader cluster 410A is at a main office (headquarters) and cluster 460B is at a satellite office of an (global) organization. In this example, index 420B can include price/cost information which is maintained at the main office and which the satellite office uses. By way of further example, index 480B can include "local" sales information which originates from the satellite office and which the main office uses. In this way, the satellite office does not reach out to the main office for information every time, and vice-versa. Instead, they each have fast access to information.

Figure 5:
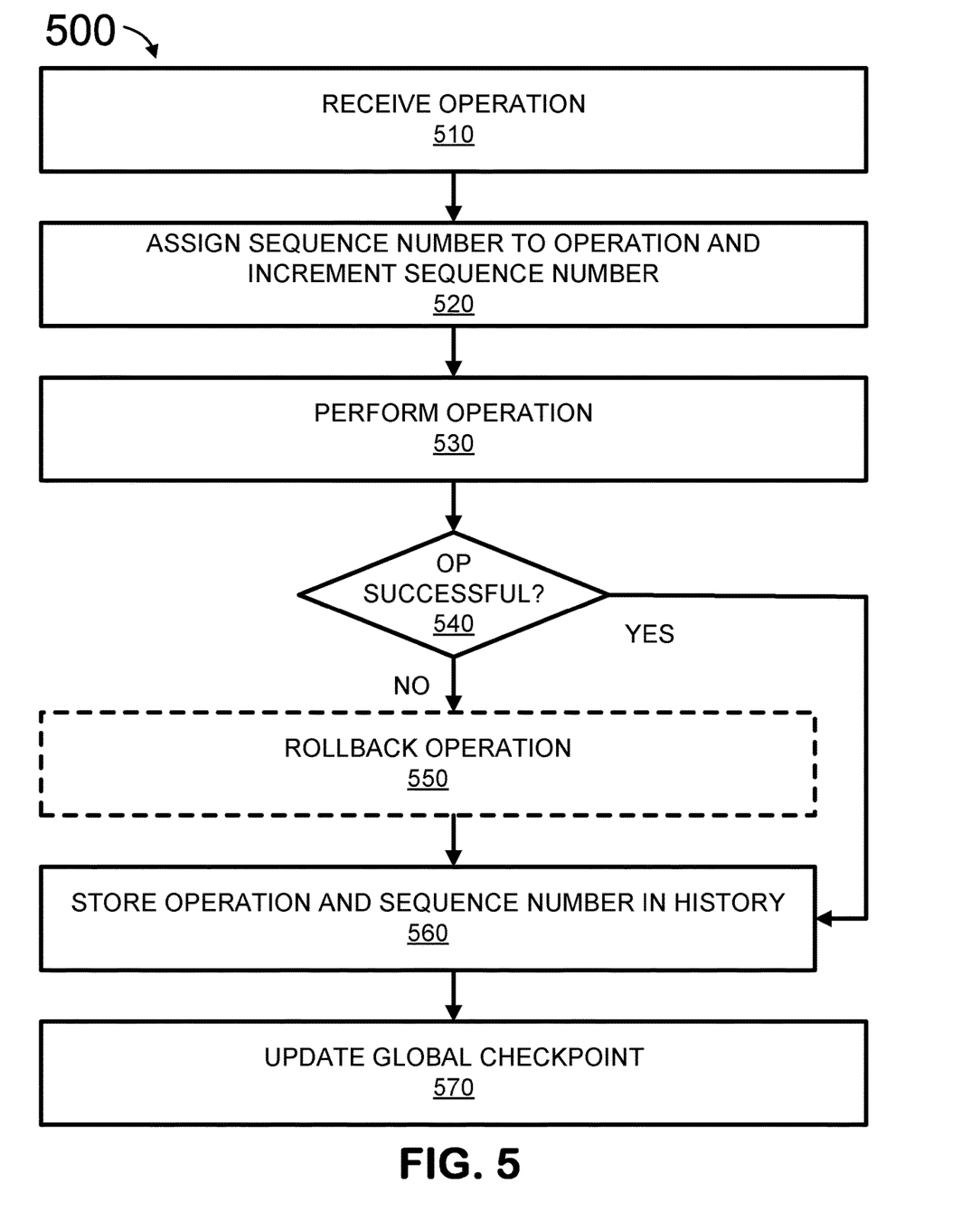
FIG. 5 is a simplified flow diagram of a method for updating history and a global checkpoint, according to some embodiments.

FIG. 5 shows method 500 for updating history and a global checkpoint, according to some embodiments. Method 500 can be performed by leader cluster 410A in FIG. 4A (and/or constituents of system 400B in FIG. 4B). Method 500 can commence at step 510 where an operation can be received. For example, an operation is creating, indexing, updating, and/or deleting a document.

At step 520, a sequence number can be assigned to the operation and the sequence number can be incremented. At step 530, the operation can be performed. At step 540, completion of the operation can be evaluated. When the operation is not successfully completed (unfulfilled), method 500 can proceed to step 550. For example, the operation is not successfully completed when the primary shard (e.g., shard 422A) has failed before successfully replicating it to all shard copies (replicas). Such operations were applied only to a part of the shard copies and may be rolled back at step 550 to achieve consistencies between the shard copies. When the operation is successfully completed, method 500 can proceed to step 560.

At step 550, the partially performed operation can optionally be rolled back. Although step 550 is depicted as occurring before step 560, it may be performed after step 560. Generally, step 550 can be performed before step 570. At step 560, the operation and its sequence number are stored in history. At step 570, a global checkpoint is updated to the sequence number associated with the successfully completed operation.

Figure 6:
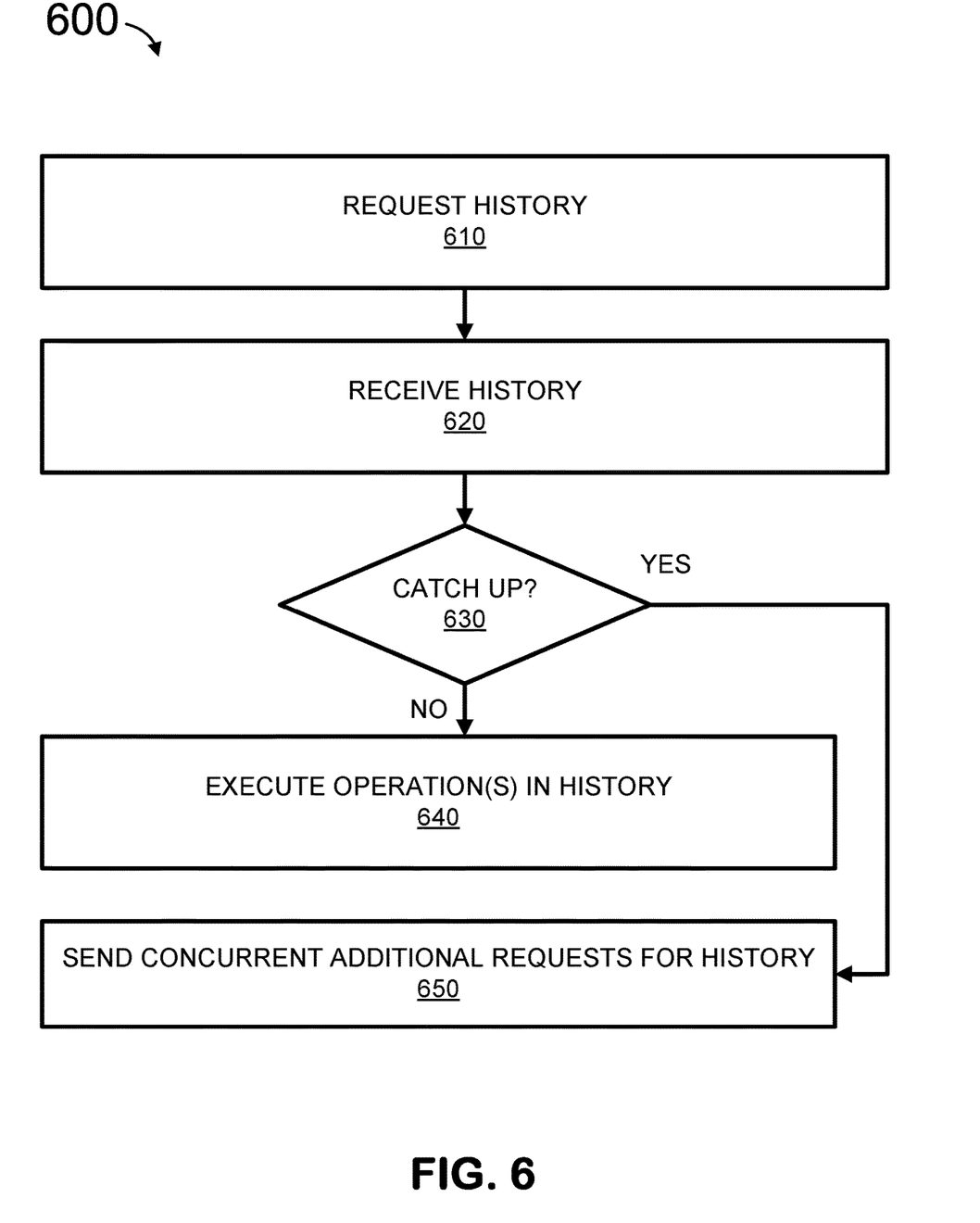
FIG. 6 is a simplified flow diagram of a method for cross cluster replication, according to various embodiments.

FIG. 6 illustrates a method 600 for cross cluster replication, in accordance with some embodiments. Method 600 can be performed by follower cluster 460A (and/or constituents of system 400B in FIG. 4B). Method 600 can commence at step 610 where history can be requested. For example, history can be requested from leader cluster 410A (FIG. 4A).

At step 620 history can be received. For example, history can be received from leader cluster 410A (FIG. 4A). In some embodiments, a global checkpoint (for a leader shard) can be included with the received history.

At step 630, whether follower shard 472A of follower index 470A (FIG. 4A) is far behind leader shard 422A of leader index 420A is evaluated. For example, the global checkpoint of leader shard 422A can be compared to the global checkpoint of follower shard 472A. Follower shard 472A can be determined to be far behind leader shard 422A when the difference between leader shard 422A's global checkpoint and follower shard 472A's global checkpoint is above a predetermined/user-defined threshold. The predetermined/user-defined threshold can be a function of an increment of history which leader cluster 410A provides in response to requests (e.g., the difference can be greater than the increment of history). When follower index 470A is determined to be far behind leader index 420A, method 500 can proceed to step 640. When follower index 470A is determined not to be far behind leader index 420A, method 500 can proceed to step 650.

At step 640, requests for additional history can be made concurrently. In some embodiments, the requests are made to leader cluster 410A. At step 650, the operations in the history can be performed (e.g., in ascending order of the respective sequence numbers or in any order).

The systems and techniques described above provide a technical solution to the problem of efficiently replicating clusters which is firmly rooted in computer technology.

Figure 7:
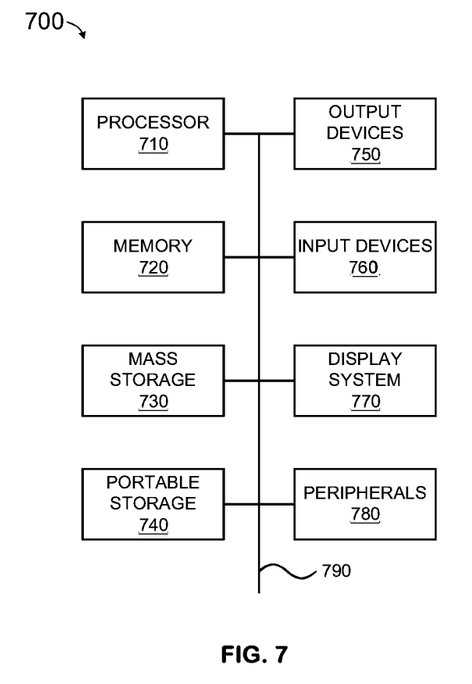
FIG. 7 is a simplified block diagram of a computing system, in accordance with some embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

Some of the components provided in the computer system 700 in FIG. 7 can be those typically found in computer systems that may be suitable for use with embodiments of the present disclosure and are intended to represent a broad category of such computer components. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for cross cluster replication comprising:
    periodically requesting by a follower cluster history from a leader cluster, the history including at least one operation and sequence number pair, the operation having changed data in a primary shard of the leader cluster;
    receiving history and a first global checkpoint from the leader cluster;
    when a difference between the first global checkpoint and a second global checkpoint exceeds a user-defined value, concurrently making multiple additional requests for history from the leader cluster; and
    when a difference between the first global checkpoint and the second global checkpoint is less than a user-defined value, executing the at least one operation, the at least one operation changing data in a primary shard of the follower cluster, such that an index of the follower cluster replicates an index of the leader cluster.

2. The computer-implemented method of claim 1, wherein the follower cluster and the leader cluster have a same number of primary shards.

3. The computer-implemented method of claim 1, wherein the history is generated by a process comprising:
    receiving an operation;
    assigning a sequence number to the operation;
    executing the operation;
    updating a global checkpoint; and
    storing the operation and sequence number in the history.

4. The computer-implemented method of claim 3 further comprising rolling back the operation when the operation is not completed on a replica shard.

5. The computer-implemented method of claim 1, wherein the second global checkpoint is a highest sequence number for which all lower sequence numbers have been processed by a follower cluster.

6. The computer-implemented method of claim 5, wherein the first global checkpoint is a highest sequence number for which all lower sequence numbers have been processed by the leader cluster.

7. The computer-implemented method of claim 6, wherein the leader cluster does not send history when a second global checkpoint sequence number is greater than or equal to a first global checkpoint sequence number.

8. The computer-implemented method of claim 1, wherein the follower cluster and the leader cluster are located in at least one of different datacenters, different cities, different countries, and different continents.

9. The computer-implemented method of claim 1, wherein the follower cluster and the leader cluster communicate with each other using a cryptographic protocol.

10. The computer-implemented method of claim 1, the follower cluster and the leader cluster are each Elasticsearch clusters.

11. A system for cross cluster replication comprising:
    a processor; and
    a memory communicatively coupled to the processor, the processor storing instructions executable by the processor to perform a method comprising:
        periodically requesting history from a leader cluster, the history including at least one operation and sequence number pair, the operation having changed data in a primary shard of the leader cluster;
        receiving history and a first global checkpoint from the leader cluster;
        when a difference between the first global checkpoint and a second global checkpoint exceeds a user-defined value, concurrently making multiple additional requests for history from the leader cluster; and
        when a difference between the first global checkpoint and the second global checkpoint is less than a user-defined value, executing the at least one operation, the at least one operation changing data in a primary shard of a follower cluster, such that the follower cluster replicates a leader cluster.

12. The system of claim 11, wherein the follower cluster and the leader cluster have a same number of primary shards.

13. The system of claim 11, wherein the history is generated by the leader cluster, the leader cluster:
    receiving an operation;
    assigning a sequence number to the operation;

executing the operation;

updating the second global checkpoint; and storing the operation and sequence number in the history.

14. The system of claim 13, wherein the method further comprises rolling back the operation when the operation is not completed on a replica shard.

15. The system of claim 11, wherein the second global checkpoint is a highest sequence number for which all lower sequence numbers have been processed by a follower cluster.

16. The system of claim 15, wherein the first global checkpoint is a highest sequence number for which all lower sequence numbers have been processed by the leader cluster.

17. The system of claim 16, wherein the leader cluster does not send history when a second global checkpoint sequence number is greater than or equal to a first global checkpoint sequence number.

18. The system of claim 11, wherein the follower cluster and the leader cluster are located in at least one of different datacenters, different cities, different countries, and different continents.

19. The system of claim 11, wherein the follower cluster and the leader cluster communicate with each other using a cryptographic protocol.

20. A non-transitory computer-readable medium having embodied thereon a program, the program being executable by a processor to perform a method for cross cluster replication, the method comprising:

periodically requesting by a follower cluster history from a leader cluster, the history including at least one operation and sequence number pair, the operation having changed data in a primary shard of the leader cluster;

receiving history and a first global checkpoint from the leader cluster;

when a difference between the first global checkpoint and a second global checkpoint exceeds a user-defined value, concurrently making multiple additional requests for history from the leader cluster; and when a difference between the first global checkpoint and the second global checkpoint is less than a user-defined value, executing the at least one operation, the at least one operation changing data in a primary shard of the follower cluster, such that an index of the follower cluster replicates an index of the leader cluster.

* * * * *

UNITED STATES PATENT AND TRADEMARK OFFICE
CERTIFICATE OF CORRECTION

PATENT NO. : 10,997,204 B2
APPLICATION NO. : 16/229847
DATED : May 4, 2021
INVENTOR(S) : Boaz Leskes Page 1 of 1

It is certified that error appears in the above-identified patent and that said Letters Patent is hereby corrected as shown below:

In the Specification

In Column 11 Lines 63-67, that portion reading:
"When follower index 470A is determined to be far behind leader index 420A, method 500 can proceed to step 640. When follower index 470A is determined not to be far behind leader index 420A, method 500 can proceed to step 650."

Should read:
"When follower index 470A is determined to be far behind leader index 420A, method 600 can proceed to step 650. When follower index 470A is determined not to be far behind leader index 420A, method 600 can proceed to step 640."

In Column 12 Lines 1-5, that portion reading:
"At step 640, requests for additional history can be made concurrently. In some embodiments, the requests are made to leader cluster 410A. At step 650, the operations in the history can be performed (e.g., in ascending order of the respective sequence numbers or in any order)."

Should read:
"At step 650, requests for additional history can be made concurrently. In some embodiments, the requests are made to leader cluster 410A. At step 640, the operations in the history can be performed (e.g., in ascending order of the respective sequence numbers or in any order)."

Signed and Sealed this
Thirteenth Day of September, 2022

Katherine Kelly Vidal
*Director of the United States Patent and Trademark Office*